United States Patent [19]

Bennett et al.

[11] E Patent Number: Re. 32,353

[45] Reissued Date of Patent: Feb. 17, 1987

[54] APPARATUS FOR CONVEYING ROD-LIKE ARTICLES

[75] Inventors: David S. Bennett; Grantley R. Hoath, both of High Wycombe, England

[73] Assignee: Molins PLC, London, England

[21] Appl. No.: 640,322

[22] Filed: Aug. 10, 1984

Related U.S. Patent Documents

Reissue of:

[64] Patent No.: 4,344,521
Issued: Aug. 17, 1982
Appl. No.: 151,984
Filed: May 21, 1980

[30] Foreign Application Priority Data

May 22, 1979 [GB] United Kingdom ..... 7917752

[51] Int. Cl.[4] ..... B65G 47/24; B65G 47/68; B65G 57/03; B65G 17/12

[52] U.S. Cl. ..... 198/404; 198/407; 198/410; 198/448; 198/951

[58] Field of Search ..... 198/404, 410, 448, 951, 198/450, 407, 408, 399

[56] References Cited

U.S. PATENT DOCUMENTS

| | | | |
|---|---|---|---|
| 2,509,725 | 5/1950 | Dalton | 198/951 |
| 2,953,235 | 9/1960 | Dearsley | 198/404 |
| 2,988,198 | 6/1961 | Pinkham | 198/951 |
| 3,221,857 | 12/1965 | Keller | 198/448 |
| 3,625,103 | 12/1971 | Giatti | 198/450 |
| 4,030,595 | 6/1977 | McCombie | 198/347 |
| 4,042,112 | 8/1977 | Molins et al. | 198/448 |
| 4,241,822 | 12/1980 | Molins et al. | 198/448 |

FOREIGN PATENT DOCUMENTS

| | | | |
|---|---|---|---|
| 842109 | 7/1960 | United Kingdom | 198/951 |
| 973365 | 10/1964 | United Kingdom | 198/951 |

*Primary Examiner*—Robert J. Spar
*Assistant Examiner*—Daniel R. Alexander
*Attorney, Agent, or Firm*—Antonelli, Terry & Wands

[57] ABSTRACT

Apparatus for conveying rod-like articles, especially cigarettes, includes parallel conveyors for streams of articles and two transfer conveyors which together re-orientate articles in one stream for combination with articles in the other stream. The transfer conveyors each convey articles on a curved path having a substantially vertical axis and include guide means for elevating the outer ends of the articles on the path. In another arrangement parallel opposed conveyors deliver articles to a downwardly-extending junction provided with retractable conveyor bands which may initially extend across the junction to aid filling. The stream on one of the opposed conveyors may be delivered from a further parallel conveyor by a rotary disc transfer conveyor which turns articles through 180 degrees for delivery to the one conveyor. The apparatus is particularly useful for tip-turning of cigarettes at the exit on a filter cigarette assembly machine.

13 Claims, 6 Drawing Figures

APPARATUS FOR CONVEYING ROD-LIKE ARTICLES

Matter enclosed in heavy brackets [ ] appears in the original patent but forms no part of this reissue specification; matter printed in italics indicates the additions made by reissue.

This invention relates to apparatus for conveying rod-like articles such as cigarettes or cigarette filter rods.

A typical machine for assembling filter cigarettes delivers two separate rows of filter cigarettes with the filter ends of the cigarettes facing one another. Before the two rows can be combined for further handling of the cigarettes it is desirable that the cigarettes in one row are turned so that their filter ends face the same way as those in the other row; this process is commonly known as "tip turning". The present invention is usefully (but not exclusively) applied to "tip turning" of filter cigarettes.

According to one aspect of the invention, apparatus for conveying rod-like articles comprises conveyor means for conveying first and second streams of rod-like articles in generally parallel directions transverse to the lengths of the articles, the articles in one stream having corresponding ends at one side of the stream relative to its direction of movement and the articles in the other stream having corresponding ends at the other side of the stream relative to its direction of movement, and transfer conveyor means for conveying articles from one or both streams to a position at which articles from both streams are formed into a combined stream in which corresponding ends of the articles are all at the same side of the stream, the transfer conveyor means being arranged to move articles in stack formation in a direction transverse to their lengths on two separate curved paths respectively about axes generally perpendicular to said directions and to articles on said paths.

Preferably, said transfer conveyor means includes at least two transfer conveyors for moving articles on said separate curved paths. Said transfer conveyor means is preferably arranged to convey articles from one of said streams on said curved paths in sequence. The curved paths may be generally horizontal and at different levels. In this case the transfer conveyors are preferably linked by a path including a vertical portion. The curved paths may be arranged so that articles travel in parallel and opposite directions on said paths. In one arrangement articles travel in parallel and opposite directions at the downstream end of one path and at the upstream end of the other path. The angles through which articles are turned on said curved paths are preferably substantially equal and may be substantially 90°.

The transfer conveyor means may comprise means for elevating the conveyed stack of articles on at least one of said curved paths so that the radius of said path may be kept small, substantially as disclosed in British Patent Specification No. 2,007,964.

The transfer conveyor means preferably includes conveyor means for moving articles in a direction transverse to said parallel directions of said first and second streams, so that articles moved by said transfer conveyor means are displaced laterally relative to said stream. Conveniently the articles from one stream, are conveyed by said transfer conveyor means and are delivered from said means at a position beneath the other stream so that articles from said other stream may simply be deposited on top of the articles from said one stream.

According to another aspect of the invention apparatus for combining substantially parallel streams of rod-like articles in stack formation, comprises a first conveyor for a first stream at a first level, a second conveyor for a second stream at the first level, a third conveyor for said second stream at the first level, means for transferring the second stream from the second to the third conveyor, a junction between said first and third conveyors, and a fourth conveyor for moving the first and second streams combined away from the junction at a second level.

In a preferred arrangement the first, second and third conveyors are substantially parallel, with the first and second conveyors moving in the same direction and the third conveyor moving in an opposite direction. The first and third conveyors may be opposed and separated by the first junction. A chute may lead down or an elevator lead up from the junction to the fourth conveyor.

The means for transferring the second stream from the second to the third conveyor preferably comprises a transfer conveyor, which may move the stream through about 180° around a substantially vertical axis. The transfer conveyor again may be substantially as disclosed in British Patent specification No. 2,007,964. Alternatively, the transfer conveyor may define a substantially similar path to the conveyor disclosed in said specification but consist of flexible plastics material in the form of a disc constrained to move along a banked path around a substantially vertical axis. The central portion of the transfer conveyor preferably comprises a hub having inwardly inclined sides which may support the inner ends of the articles on the banked portion of the conveyor. Transfer from the second conveyor onto the transfer conveyor and from the transfer conveyor onto the third conveyor may be by way of dead plates adapted to reorientate or straighten the articles during transfer. For example, the line of transfer between the dead plates and the transfer conveyor need not be parallel to the passing articles, so that one end or part of the lowermost articles in the stream is contacted before the other end or, parts.

According to a further aspect of the invention apparatus for conveying rod-like articles and for combining streams of rod-like articles moving in stack formation in substantially opposite directions, comprises a junction zone for said streams, a path for delivering articles away from the junction zone, and means for priming the junction zone including means restricting passage through the junction zone until sufficient articles have accumulated in or upstream of the junction zone, so that leading articles are bounded and controlled to prevent misalignment.

The priming means may comprise means restricting exit from the junction zone and may further comprise means responsive to pressure of articles in or adjacent the junction zone. In a preferred arrangement the priming means includes at least one conveyor band which may extend across the junction and which may be retracted. The conveyor band may be a resiliently-loaded drive band which extends across the junction to substantially close it until the pressure of articles in the junction overcomes the resilient loading. For example the band could normally be curved by pressure of articles and convey the articles in a curved path leading from the junction to the fourth conveyor. Alternatively, or additionally, a flexible curtain of relatively heavy or other material (e.g. chain-mail) could extend in the junction. Another possibility is a sensor or pressure plate associated with the junction (e.g. above it) and linked to mechanism for restricting the width of the exit from the junction; as pressure builds up in the junction the sensor operates the linkage to increase the width of the exit and allow articles to pass from the junction.

Apparatus for combining streams according to the invention and including a junction is particularly suited for use as a tip turner. In this case, in a preferred arrangement, parallel streams of filter cigarettes are received from a filter cigarette assembling machine and a first stream passes to one side of the junction while the other stream passes to the other side of the junction, having been turned so that on combining beyond the junction the tips of the cigarettes are at corresponding ends in the combined stack. Priming means is particularly useful since one stream (the first) will normally arrive at the junction before the other because it has a shorter path length from the assembling machine. The priming means is preferably loaded so as to accept the first stream and pass it through the junction before the second stream reaches the junction; this avoids an undesirable build-up of cigarettes on the first side of the junction.

The invention will now be further described, by way of example only, with reference to the accompanying drawings, in which.

Figure 1:
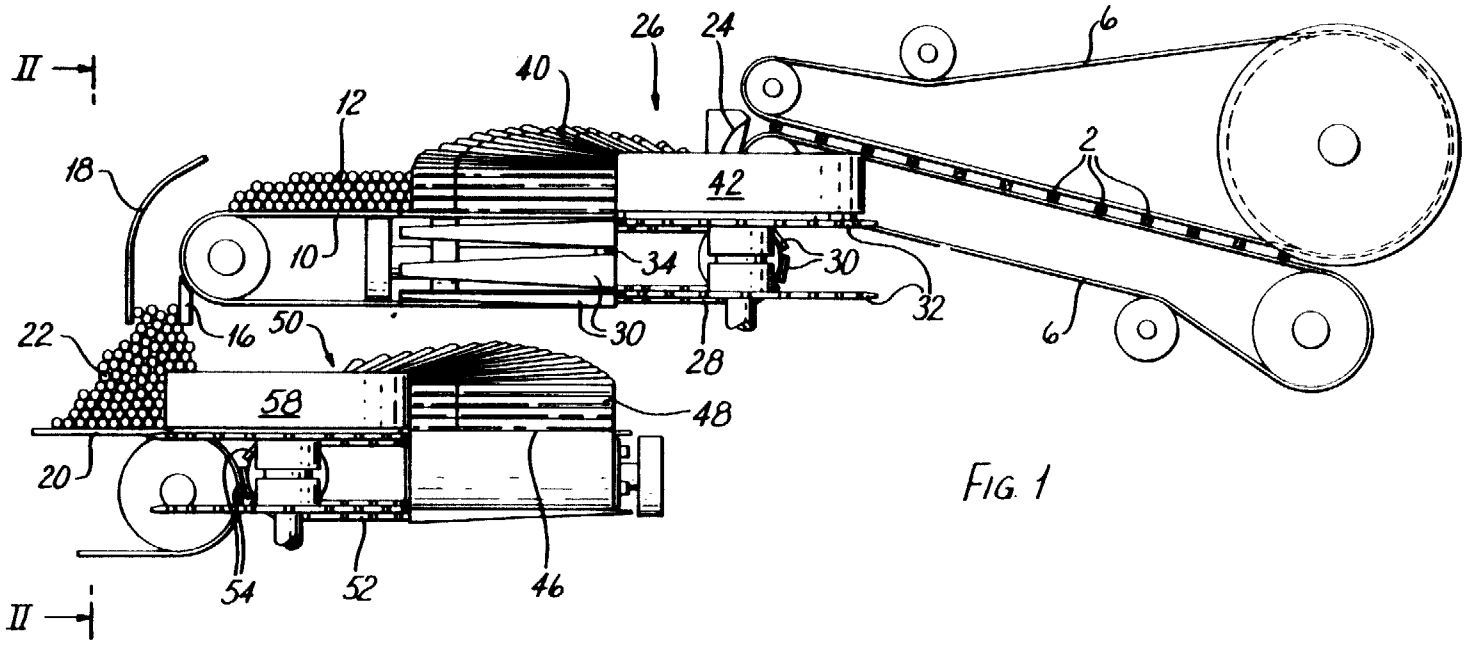
FIG. 1 is a side view of apparatus for conveying cigarettes.
Figure 2:
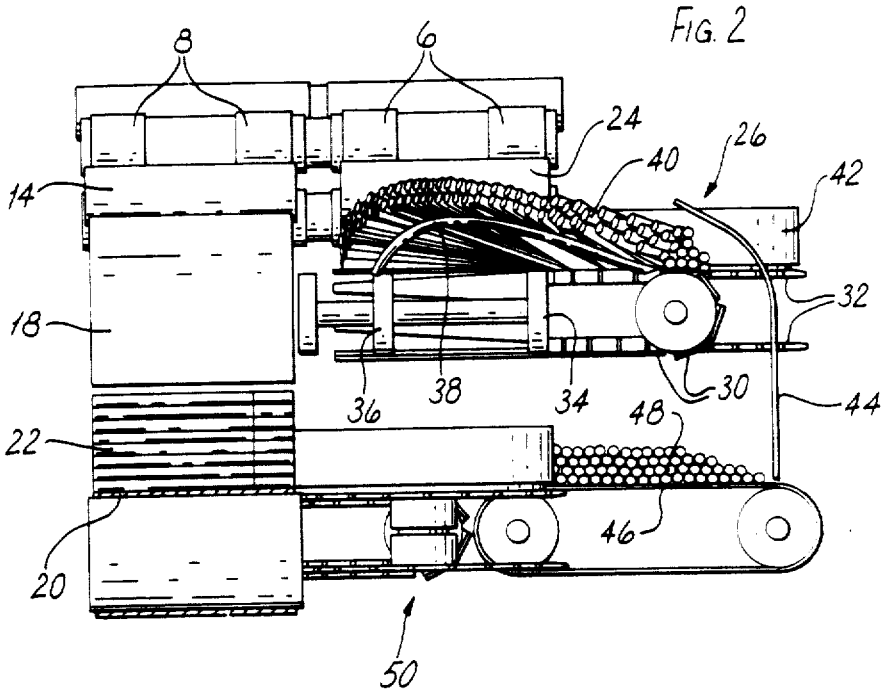
FIG. 2 is an end view of the apparatus of FIG. 1 on the line II—II of FIG. 1.
Figure 3:
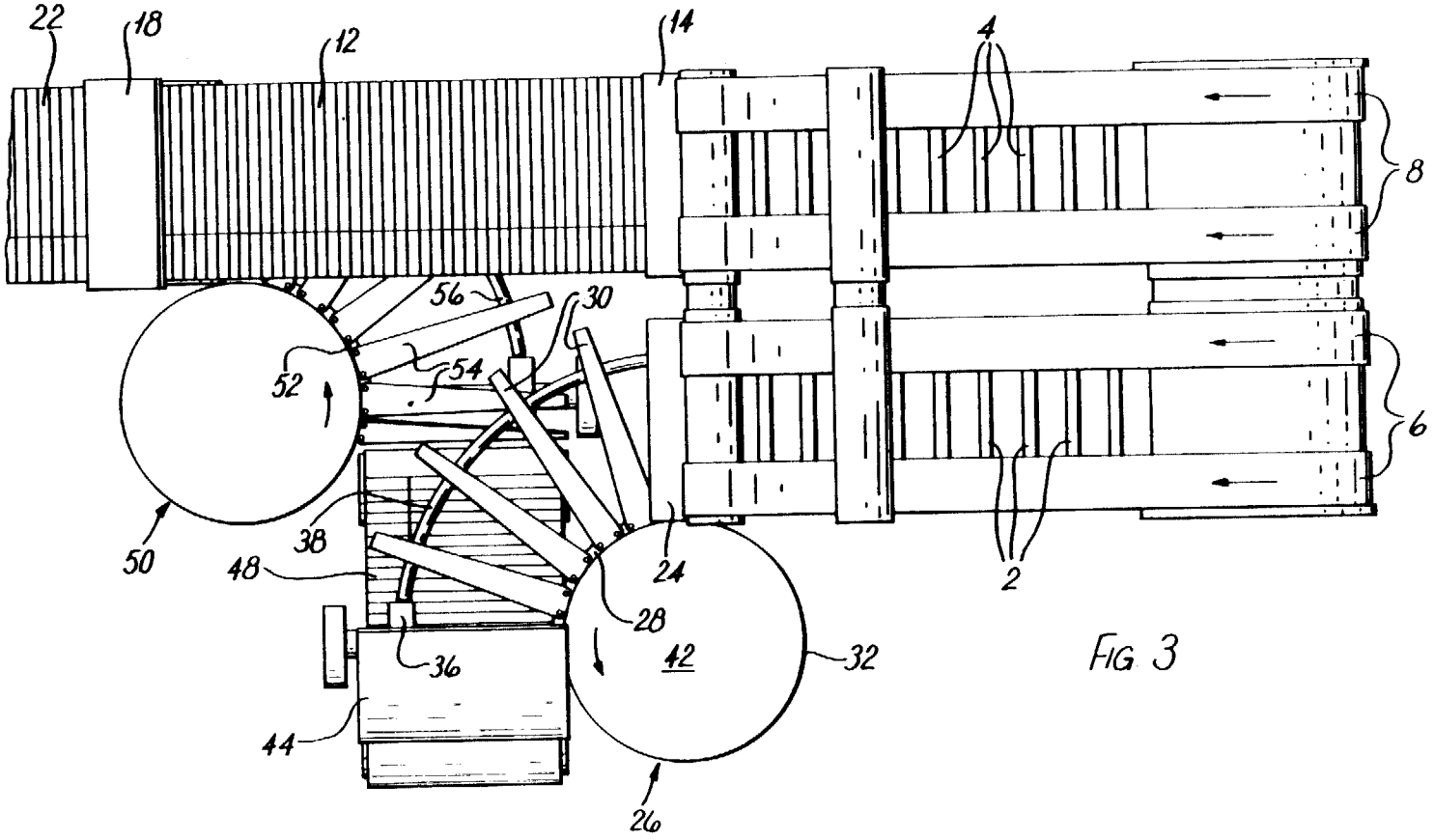
FIG. 3 is a plan view of the apparatus of FIG. 1.

FIGS. 1 to 3 show apparatus for conveying cigarettes away from a machine for assembling filter cigarettes, such as a Molins PA8. Two parallel streams of cigarettes 2, 4 with the filter tip ends of the cigarettes facing in opposite directions and lying adjacent one another, are conveyed away from the machine between two pairs of laterally spaced upper and lower bands 6,8, respectively. The paths between the [bends] *bands* 6 and the bands 8 are in the same plane and are inclined upwards from the receiving position on the assembling machine.

The cigarettes 4 are delivered from between the bands 8 onto a band conveyor 10 which moves at a slower speed than the bands 8 so that a stack 12 is formed. A curved guide 14 directs the cigarettes 4 onto the stack 12; a sensor for controlling the speed of the bands 8 and/or the conveyor 10 may be associated with the stack forming region under the guide 14.

The stack 12 is delivered from the conveyor 10 to a short downdrop 16, partly defined by a further guide surface 18, onto another band conveyor 20 which conveys a stack 22 at the same speed as the stack 12. Thus, as best seen in FIGS. 2 and 3, the path of the cigarettes 4 through the apparatus, via stacks 12 and 22, is between parallel vertical planes. The filter tipped ends of the cigarettes 4 therefore remain facing in the same direction in the stacks 12 and 22.

The cigarettes 2 follow a more complicated path through the apparatus, as will be described below. From the bands 6 the cigarettes 2 are guided by a surface 24, which is similar to the surface 14, onto a conveyor 26 which turns the cigarettes through an angle of 90° about a vertical axis located to the right-hand side of the cigarettes relative to their direction of movement. The conveyor 26 comprises an endless chain 28 carrying cantilevered slats 30. The chain 28 runs around the 90° curve on vertically-spaced sprockets 32 and around inner rollers 34 at the ends of the curve. The positions of the outer ends of the slats 30 are determined by outer rollers 36 at the ends of the curve and by guide rails 38 around the curve. The upper guide rail 38 is elevated on the curve.

The rotational speed of the conveyor 26 is less than the speed of the bands 6 so that a stack 40 is formed on the slats 28 beneath the guide 24. As with the cigarettes 4 and bands 8 the speed of delivery of cigarettes 2 by bands 6 and/or the speed of the conveyor 26 may be controlled by sensor means in the vicinity of the guide 24 to control the formation of stack 40. Since the upper rail 38 elevates the slats 30 the outside of the stack 40 on the curve on conveyor 26 is similarly elevated. The inner ends of the cigarettes in stack 40 are prevented from slipping, if necessary, by a cylinder 42 above the upper sprocket 32. By elevating the stack 40 on the outside of the curve it is possible to turn it through a curve of very small radius, and thus to turn it through 90° in a short space. For further details of apparatus for conveying cigarettes on a curve of this type reference is directed to British Patent specification No. 2,007,964, the disclosure of which is hereby incorporated herein in its entirety.

At the end of the 90° curve the stack 40 is delivered downwards via a guide 44 onto a band 46 for form another stack 48. Since the direction of movement of the cigarettes is effectively reversed between the stacks 40 and 48 it should be noted that the filter tip ends of the cigarettes are now on the left-hand side relative to their direction of movement, as those of the cigarettes 4. The stack 48 is moved by the band 46 inwards towards a conveyor 50 which turns the cigarettes through an angle of 90° about a vertical axis located to the left-hand side of the cigarettes relative to their direction of movement. The conveyor 50 is basically similar to the conveyor 26 and includes a chain 52, elevated guide rail 56 and upper cylinder 58. The exit from the conveyor 50 for the stack 48 is directly onto the band conveyor 20. Thus the stack 22 on conveyor 20 comprises the stack 48 delivered from the conveyor 50 and the stack 12 delivered via the downdrop 16 onto the stack 48 on the conveyor 20. The conveyors 26 and 50, together with the conveyor 46, therefore move the cigarettes 2 on a path which displaces them into line with the cigarettes 4 and also turns them laterally through 180° so that their filter tip ends face in the same direction as those of the cigarettes 4.

Instead of using conveyors 26, 50, which include chains and cantilevered slats, to turn the cigarettes from one stream through the required 90° curves it would be possible to use conveyors which comprise discs of flexible plastics material in which the disc is constrained to an elevated position on the outside of the curve and depressed on the inside of the curve. The periphery of the disc may be formed with separate fingers, each of which may carry a projection for aiding conveyance of the cigarettes around the curve. A conveyor of this type is disclosed in FIGS. 4 and 5 of our copending British Patent Application No. 7,917,753, the disclosure of which is hereby incorporated in its entirety.

The inclination of the bands 6 and 8 can be adjusted, by pivoting about the axis of the large roller. Thus the apparatus is adapted to receive cigarettes from machines having different output levels for any given height of the conveyor 20. The inclination of the bands 6 and the bands 8 need not be the same, although by elevating the cigarettes 4, room for the conveyor 50 beneath the band 10 is obtained.

Figure 4:
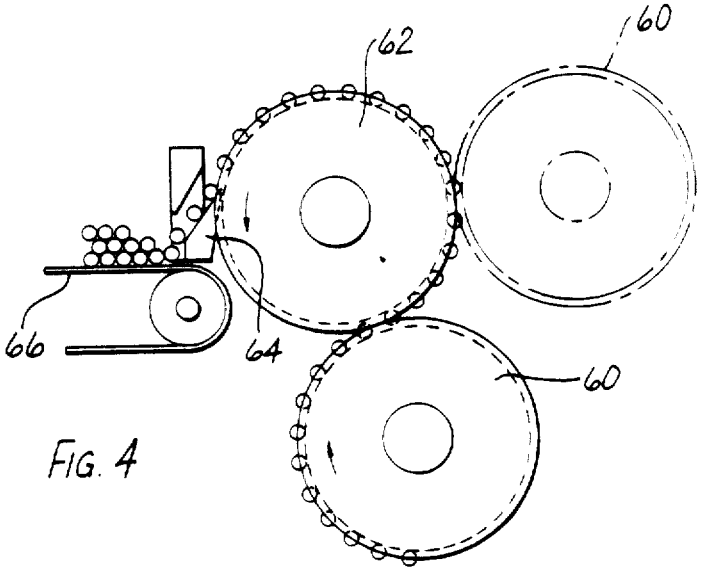
FIG. 4 is a side view of part of a modified apparatus for conveying cigarettes.

A modification of the feed into the apparatus from an assembling machine is shown in FIG. 4. In this modification the bands 6, 8 are replaced by pairs of fluted drums 60, 62, with the upper drum 62 delivering cigarettes directly to a stationary stripping guide 64 and onto a stack conveyor band 66. The position of the drum 62 relative to the drum 60 (which may be an output drum of the assembling machine) is variable, as indicated by the position of the drum 60 in chain dot lines in FIG. 4, so that the height of the apparatus relative to the assembling machine is also variable. The drums 60 and 62 could rotate in directions opposite to those shown in FIG. 4; in that case the drum 62 would positioned at an elevated position relative to the band 66 and deliver cigarettes onto a guide less steeply inclined than the guide 64.

Figure 5:
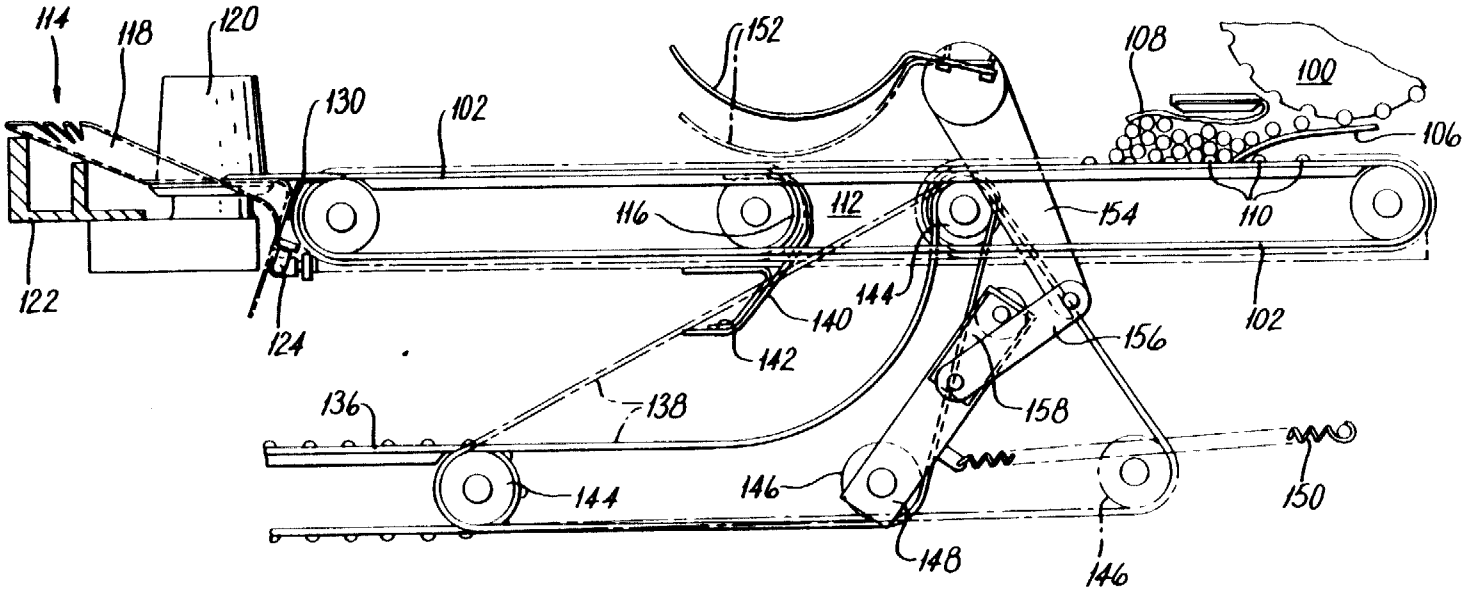
FIG. 5 is a side view of further apparatus for conveying cigarettes.
Figure 6:
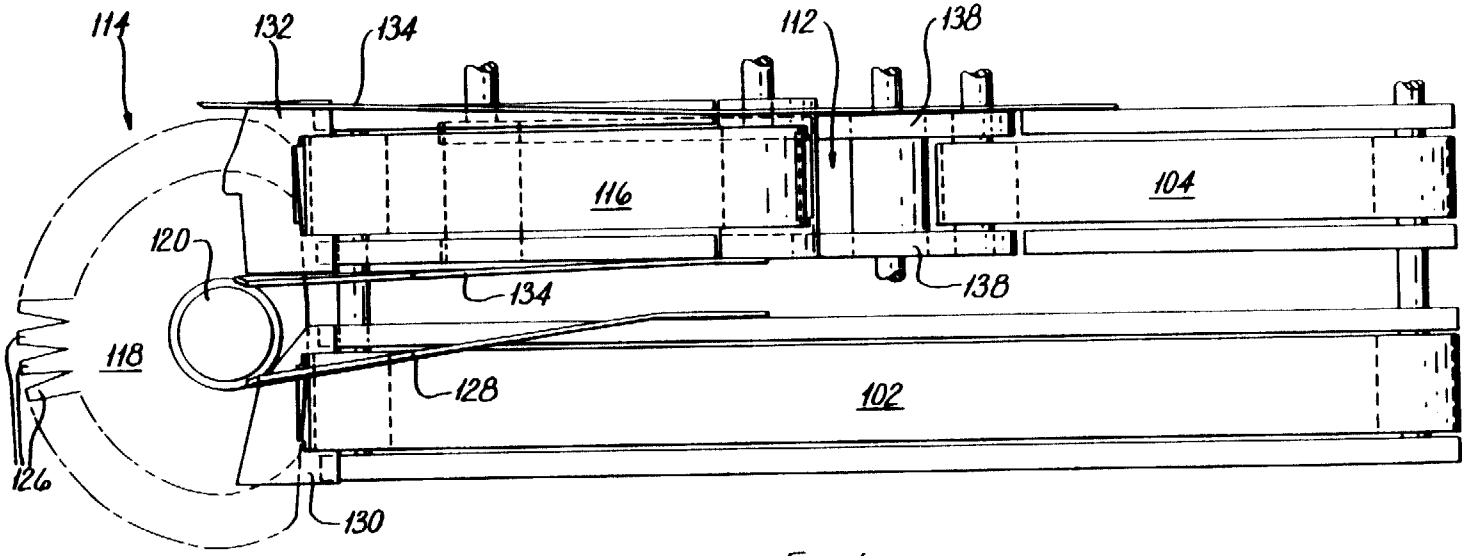
FIG. 6 is a plan view of the apparatus of FIG. 5.

FIGS. 5 and 6 show further apparatus for conveying cigarettes away from a machine for assembling filter cigarettes, such as Molins PA8. A final cut or delivery drum 100 of the plug assembling machine delivers two parallel streams of cigarettes with the filter tip ends of the cigarettes facing in opposite directions. Parallel band conveyors 102, 104 receive cigarettes from the respective stream on the drum 100. An inclined guide 106 transfers the cigarettes from the drum 100 on to the conveyor 102 underneath a flexible curtain 108. The curtain 108 helps initial formation of a stack on the conveyor 102. A guide and curtain (not shown) similar to the guide 106 and curtain 108 are associated with the conveyor 104 on which a stack is formed in the same way as on the conveyor 102. Each conveyor 102, 104 is formed with half-round pips or flights 110 to aid conveyance of the cigarettes.

The conveyor 104 leads to a junction 112. The conveyor 102 leads to a transfer conveyor 114 which turns the stream on conveyor 102 through approximately 180° and delivers it onto a further flighted band conveyor 116. The conveyor 116 delivers the stream from conveyor 102 to the side of the junction 112 opposite the conveyor 104.

The transfer conveyor 114 comprises a substantially circular disc 118 of flexible plastics material rotatable about a substantially vertical axis and including a central rotatable frusto-conical hub 120. The disc 118 is constrained to have a substantially horizontal surface for receiving cigarettes from the conveyor 102 and for delivering cigarettes to the conveyor 116. Intermediate these positions, on the conveying side of the disc the outer surface is elevated by guide means 122 to provide a banked path for the cigarettes, thereby allowing a particularly small radius bend. Opposite its banked portion the disc 118 is depressed below the level of the conveyors 102 and 116 by adjustable guide means 124. The guide means adjacent the conveyor 102 may be of slightly different shape to that adjacent the conveyor 116. For example, an additional guide adjacent the periphery of the disc 118 at its point of greatest radius may be required near the conveyor 116, to avoid excessive distortion of the disc. The outer periphery of the disc 118 is slit to form fingers 126, in order to allow flexing of the disc without kinking.

A stationary guide 128 progressively moves cigarettes outwardly of the conveyor 102 for entry onto the disc 118 of the transfer conveyor 114. The flights 110 on the conveyor 102 help to maintain the cigarettes parallel. A dead plate 130 is positioned between the end of the conveyor 102 and the disc 118 for transfer of cigarettes therebetween. The trailing edge of the dead plate 130 is inclined at about 14° relative to the axis of the cigarettes; this has been found to aid smooth transfer onto the disc 118.

On the transfer conveyor 114 the cigarettes are progressively elevated by the disc 118 and then maintained at a constant inclination until the guide means 122 allows the disc to progressively lower and deliver the cigarettes on to a dead plate 132 for transfer to the conveyor 116. The plate 132 has a projecting element for helping to strip the cigarettes from the disc 118. Inwardly directed side guides 134 align the stream on the conveyor 116.

After the plug assembling machine has been operating for some time opposed streams of cigarettes are delivered respectively by the conveyors 104 and 116 to the junction 112. The streams are combined at the junction 112 and descend for delivery by a flighted conveyor 136. At and below the junction 112 a pair of transversely-spaced resiliently-loaded conveyor bands 138 define the path from the conveyors 104 and 116 to the conveyor 136. On the opposite side of the junction 112 to the bands 138 a flexible curtain 140 (shown in FIG. 5 in the position it would assume when the junction is full of cigarettes) is suspended from a position adjacent the end of conveyor 116. A stationary guide surface 142 defines the limit of the movement of curtain 140.

The bands 138 pass around two fixed rollers 144 and a movable roller 146 mounted on a pivoted arm 18 and resiliently loaded by a spring 150. When the bands 138 are not subject to pressure from cigarettes in and below the junction 112 the spring 150 causes the roller 146 to move to the position shown in chain-dot lines so that the bands 138 are stretched between the rollers 144 and effectively close the exit from the junction 112, as shown in chain-dot lines in FIG. 5. The curtain 140 would then extend vertically downwards from its fixing position adjacent the end of conveyor 116.

Assuming that the junction 112 is empty and that the filter assembling machine is then started the stream of cigarettes on the conveyor 104 reaches the junction 112 with the exit substantially closed as just described. Increasing pressure from the cigarettes progressively causes the bands to move downwards and thus open the exit to the junction. In order to direct the pressure onto the bands a horizontally pivoted pressure plate (not shown) may be positioned above the junction 112 to prevent substantial upward movement of the cigarettes at the junction. The apex between the curtain 140 and the bands 138 progressively advances with the stream until the junction 112 and the region between the bands 138 and guide surface 142 is full, the leading cigarettes being constantly maintained under control to prevent skewing or misalignment. The bands 138 may not be fully retracted against the tension of spring 150 until the stream from the conveyor 116 also reaches the junction 112. A curved backing plate (not shown) may define the maximum position of the bands 138 as shown in FIG. [1] 5.

As an alternative or in addition to the use of a spring 150 the pressure above the junction 112 may be used to control positioning of the bands 138. Thus a pivoted curved pressure sensor 152 may operate through a linkage comprising levers 154, 156, 158 and 148 to move the roller 146. Thus as pressure builds up over the junction 112 the roller 146 is advanced to the left (as shown in FIG. 5) to allow the bands 138 to become curved and open the exit to the junction 112. It should be noted that the sensor 152 is asymmetrically positioned over the junction 112. This is so that the sensor 152 is optimally positioned for reaction to the stream on conveyor 104, which is the stream for which priming is usually necessary.

It is possible that a sensor could be positioned over the junction 112 to control the speed of the bands 138 and/or the conveyor 136. However, since the apparatus is associated with a filter cigarette assembling machine which is delivering cigarettes at a known rate it is normally unnecessary to provide such control, the relative speeds of the conveyors and bands being preset. In this respect it should be noted that the conveyors 102 and 104 normally travel at the same speed, being lower than the peripheral speed of the drum 100. Preferably the speed of conveyors 102, 104 is constantly related to the speed of drum 100 (and hence to that of the assembling machine). The conveyor 116 travels at the same speed as the conveyor 102, with the transfer conveyor 114 travelling at a corresponding speed. The speed of conveyor 136 need not be twice that of the conveyors 104 and 116 since the stack height may be increased on the conveyor 136. The bands 138 may be driven at a speed corresponding to that of the conveyor 136 or may be driven at a different speed (either faster or slower). In this respect it should be noted that the bands 138 are not flighted.

Reference is directed to British Patent Specifications Nos. 1,453,191 and 1,540,831 which disclose band tensioning arrangements which may be incorporated in priming means for the arrangement of FIGS. 5 and 6.

We claim:

1. Apparatus for conveying rod-like articles, comprising conveyor means for conveying first and second streams of rod-like articles in generally parallel directions transverse to the lengths of the articles, the articles in one stream having corresponding ends at one side of the stream relative to its direction of movement and the articles in the other stream having corresponding ends at the other side of the stream relative to its direction of movement, and transfer conveyor means for conveying articles from at least one stream to a position at which articles from both streams are formed into a combined stream in which corresponding ends of the articles are all at the same side of the stream, the transfer conveyor means including two transfer conveyors arranged in sequence with a down-drop disposed therebetween to move articles in stack formation in a direction transverse to their lengths on two separate generally horizontal curved paths at different levels respectively in opposite directions about axes generally perpendicular to said directions and to articles on said paths.

2. Apparatus for conveying rod-like articles including first and second conveyors respectively arranged to move first and second single-row streams in generally-parallel directions transverse to the lengths of the articles, the articles in one stream having corresponding ends at one side of the stream relative to its direction of movement and the articles in the other stream having corresponding ends at the other side of the stream relative to its direction of movement, first and second substantially-adjacent stack-forming means for respectively converting said first and second streams into multi-layer stack formation, further conveyor means for conveying said first stream in stack formation on a substantially-planar path, and transfer conveyor means for conveying said second stream in stack formation onto said path so that said first and second streams form a combined multi-layer stream on said path with corresponding ends of the articles all at the same side of the stream, the transfer conveyor means including first and second transfer conveyors, the first transfer conveyor being arranged immediately beneath said second stack-forming means so that said second stream is formed into a multi-layer stack on said first transfer conveyor, said first transfer conveyor defining a first curved path about an axis generally perpendicular to the direction of movement of the stream on said conveyor, and said second transfer conveyor defining a second curved path about an axis generally perpendicular to the direction of movement of the stream on said conveyor, said first and second curved paths curving in opposite directions relative to the respective directions of movement of the stream on said paths and respectively including portions in which said stream is conveyed in substantially parallel and opposite directions.

3. Apparatus as claimed in claim 2, wherein said first and second transfer conveyors are at different levels and said second conveyor is arranged at least partly beneath said first conveyor.

4. Apparatus as claimed in claim 2, wherein said curved paths are generally horizontal and at different levels.

5. Apparatus as claimed in claim 4, wherein said transfer conveyors are linked by a path including a vertical portion.

6. Apparatus for conveying rod-like articles, comprising conveyor means for conveying first and second single-row streams of rod-like articles in generally-parallel directions transverse to the lengths of the articles, the articles in one stream having corresponding ends at one side of the stream relative to its direction of movement and the articles in the other stream having corresponding ends at the other side of the stream relative to its direction of movement, first and second substantially-adjacent stack-forming means at a first level and arranged respectively to convert said first and second streams into multi-layer stack formation, further conveyor means for conveying said first stack in stack formation from said first stack-forming means on a substantially-planar path including a downwardly-extending portion and a portion at a lower second level, and transfer conveyor means for conveying said second stream in stack formation directly from said second stack-forming means onto said path at said second level to form a combined stream in which corresponding ends of the articles are all at the same side of the stream, the transfer conveyor means including a first transfer conveyor at said first level for conveying said second stream on a curved path about an axis substantially perpendicular to its direction of conveyance, and a second transfer conveyor at said second level for conveying said second stream on a curved path about an axis substantially perpendicular to its direction of conveyance, said second transfer conveyor lying at least partly beneath said first transfer conveyor, said transfer conveyor means further including a curved downwardly-extending path portion connecting said first and second curved paths, *wherein said curved paths are arranged so that articles travel in parallel and opposite directions at the downstream end of one curved path and at the upstream end of the other curved path.*

[7. Apparatus as claimed in claim 6, wherein said paths are arranged so that articles travel in parallel and opposite directions at the downstream end of one path and at the upstream end of the other path.]

8. Apparatus as claimed in claim 6, wherein the angles through which articles are turned on said curved paths are substantially equal.

9. Apparatus as claimed in claim 8, wherein said angles are substantially 90°.

10. Apparatus as claimed in claim 6, wherein the transfer conveyor means includes conveyor means for moving articles in a direction transverse to the directions of movement of said first and second streams.

11. Apparatus as claimed in claim 6, wherein the transfer conveyor means includes means for inclining articles inwardly on at least one of said curved paths, so that the inner ends of articles in the stack on said one path are lower than the outer ends.

12. Apparatus as claimed in claim 6, wherein on one of said curved paths corresponding ends of the articles are on the outside of said path and on the other of said curved paths corresponding ends are on the inside of said path.

*13. Apparatus for conveying rod-like articles including first and second conveyors respectively arranged to move first and second single-row streams in generally similar directions transverse to the lengths of the articles, the articles in one stream having corresponding ends at one side of the stream relative to its direction of movement and the articles in the other stream having corresponding ends at the other side of the stream relative to its direction of movement, first and second stack-forming means for respectively converting said first and second streams into multi-layer stack formation, further conveyor means for conveying said first and second streams in stack formation on a substantially common path, and transfer conveyor means for conveying at least one of said streams in stack formation onto said path so that said first and second streams form a combined multi-layer stream on said path with corresponding ends of the articles all at the same side of the stream, the transfer conveyor means including first and second transfer conveyors, said first transfer conveyor defining a first curved path about an axis generally perpendicular to the direction of movement of the stream on said conveyor, and said second transfer conveyor defining a second curved path about an axis generally perpendicular to the direction of movement of the stream on said conveyor, said first and second curved paths curving in opposite directions relative to the respective directions of movement of the stream on said paths and respectively including portions in which articles are conveyed in substantially parallel and opposite directions.*

*14. Apparatus for conveying rod-like articles, comprising conveyor means for conveying first and second single-row streams of rod-like articles in generally-parallel directions transverse to the lengths of the articles, the articles in one stream having corresponding ends at one side of the stream relative to its direction of movement and the articles in the other stream having corresponding ends at the other side of the stream relative to its direction of movement, first and second substantially-adjacent stack-forming means at a first level and arranged respectively to convert said first and second streams into multi-layer stack formation, further conveyor means for conveying said first stack in stack formation from said first stack-forming means on a substantially-planar path including a downwardly-extending portion and a portion at a lower second level, and transfer conveyor means for conveying said second stream in stack formation directly from said second stack-forming means onto said path at said second level to form a combined stream in which corresponding ends of the articles are all at the same side of the stream, the transfer conveyor means including a first transfer conveyor at said first level for conveying said second stream on a curved path about an axis substantially perpendicular to its direction of conveyance, and a second transfer conveyor at said second level for conveying said second stream on a curved path about an axis substantially perpendicular to its direction of conveyance, said second transfer conveyor lying at least partly beneath said first transfer conveyor, said transfer conveyor means further including a curved downwardly-extending path portion connecting said first and second curved paths, wherein the angles through which articles are turned on said curved paths are substantially equal.*

* * * * *